Figure 1:
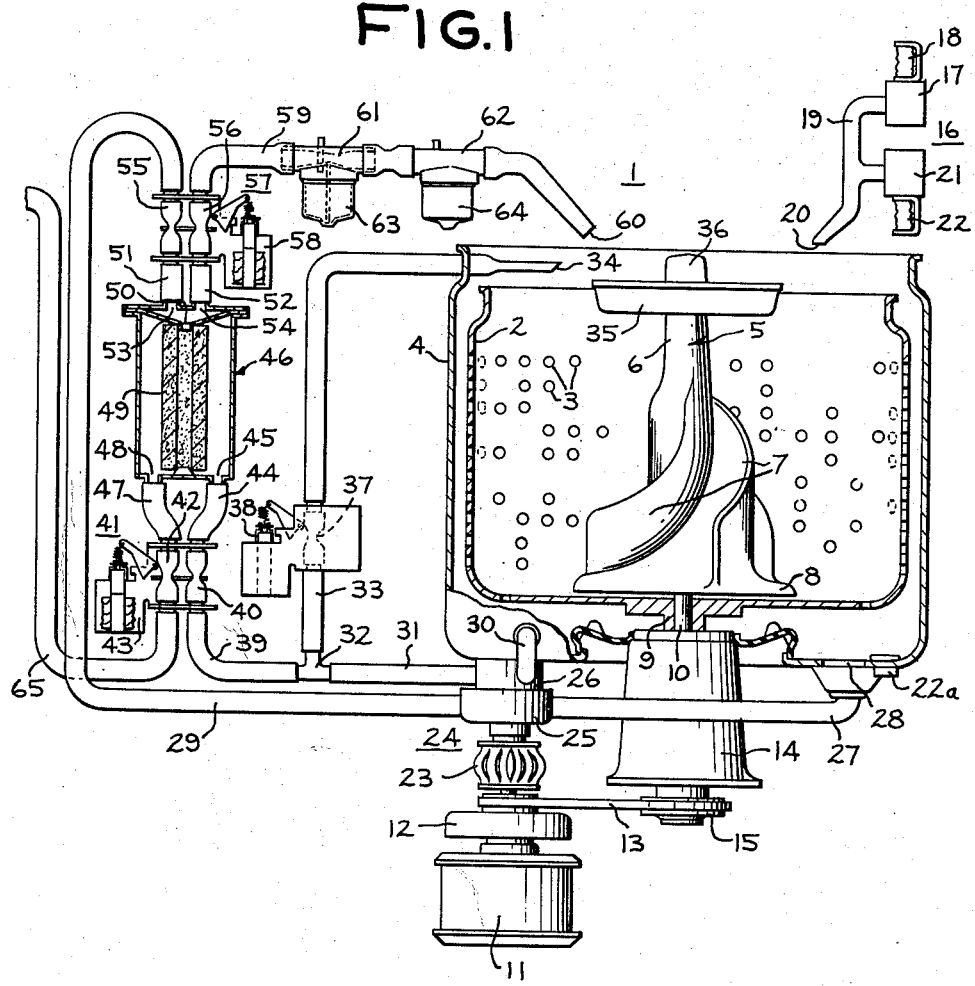

Feb. 23, 1965  J. C. WORST  3,170,314
WASHING SYSTEM FOR ECONOMIZING ON WATER USAGE
Filed Aug. 12, 1963  2 Sheets-Sheet 1

INVENTOR.
JOSEPH C. WORST
BY
HIS ATTORNEY

Feb. 23, 1965   J. C. WORST   3,170,314
WASHING SYSTEM FOR ECONOMIZING ON WATER USAGE
Filed Aug. 12, 1963   2 Sheets-Sheet 2
FIG.2
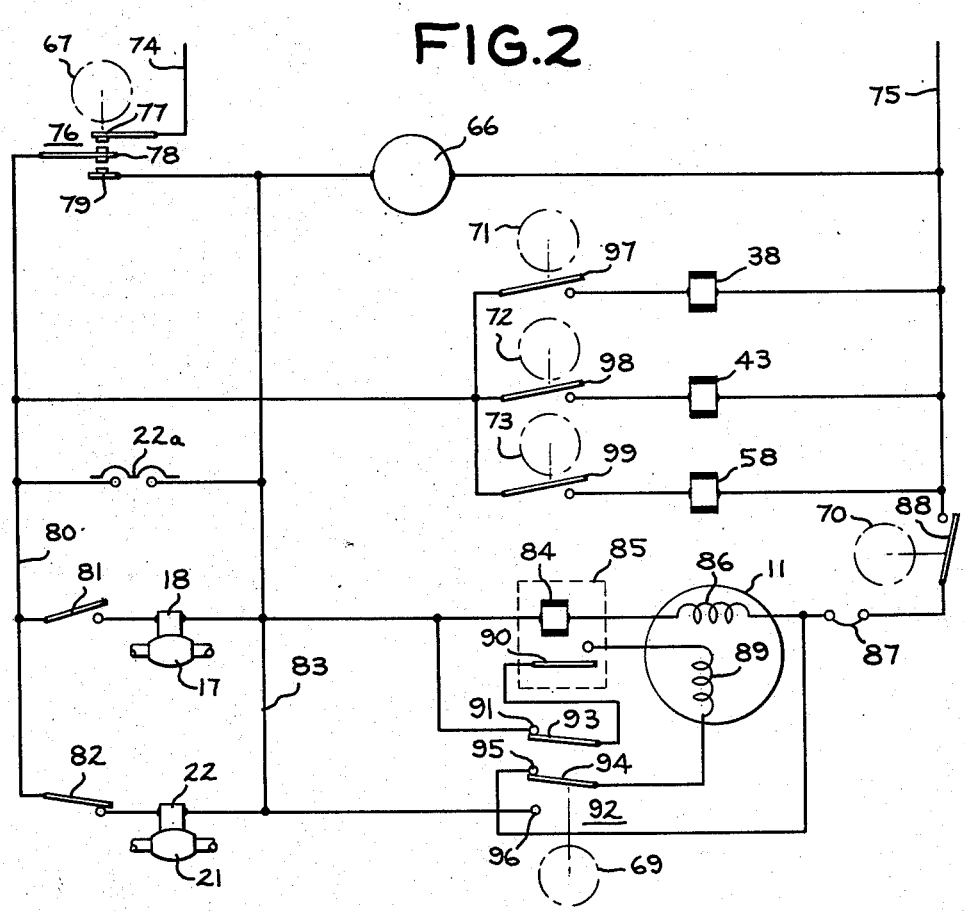
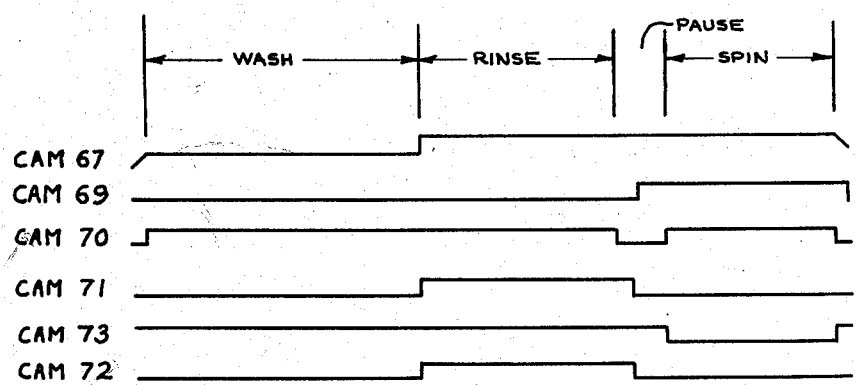
FIG.3
INVENTOR.
JOSEPH C. WORST
BY
HIS ATTORNEY

3,170,314
WASHING SYSTEM FOR ECONOMIZING ON WATER USAGE

Joseph C. Worst, Louisville, Ky., assignor to General Electric Company, a corporation of New York
Filed Aug. 12, 1963, Ser. No. 301,385
3 Claims. (Cl. 68—12)

This invention relates to washing systems and machines, and more particularly to such systems wherein means are provided for minimizing the amount of water required for a full cycle of operation of the machine.

Conservation of fresh water and minimizing of the amount of vitiated water put into sewer systems are both becoming matters of public concern. Because of this, it is highly desirable to make optimum usage of water taken from a fresh water supply prior to passing it out through a drain to a sewer system or a septic tank. This is particularly true in the case of domestic clothes washing machines which receive extensive usage, and therefore require substantial amounts of water.

It is accordingly an object of my invention to provide a washing system in which optimum usage is made of the water, thereby minimizing the amount of water used.

A further more specific object of my invention is to provide a washing system wherein the water used for rinsing is the same as the water used for washing, after proper treatment has been provided to the water.

A further more specific obejct of my invention is to provide such a system wherein a washing operation is immediately followed by circulation of the water used in that washing operation through an appropriate filtration system, with the rinsing of the clothes which have just been washed being effected by the water passed through the filtration system.

In one aspect of my invention, I provide a washing system wherein container means are adapted to receive articles and water, the water being provided from suitable supply means. The container means are associated with washing means so that washing of articles in the container may be effected. Circulating means are provided to circulate water from the container means to suitable filtration means for filtering soil from the water, and for then passing the filtered water back to the container means. In addition, a drain may be provided in the conventional way for effecting removal of water from the container means to the drain after use of the water has terminated. The system includes suitable sequence control means for causing in sequence, first, operation of the supply means, second, operation of the washing means, third, operation of the circulating means substantially after the start of the washing operation, and fourth, operation of the drain means. With this system, the rinsing of articles in the same water which is used to wash them, and in the same sequence of operations, may be provided so that a minimum amount of water is required from the supply system, and similarly a minimum amount of water is passed out to drain.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings:

In the drawings, FIGURE 1 is a scematic front elevational view of a clothes washing machine incorporating my system, the view being partly in section to illustrate details;

FIGURE 2 is a schematic electrical diagram showing the control arrangement used in the system of FIGURE 1; and FIGURE 3 is a schematic view showing a development of the cam surfaces used in the control of timer operated switches shown in FIGURE 2, thereby indicating the operation of the switches by the cams throughout a washing cycle.

Referring now to FIGURE 1 of the drawings, there is shown therein, in schematic form, an agitator type washing machine, generally indicated by the numeral 1. Machine 1 includes a clothes basket 2 having perforations 3 over its side and bottom walls and disposed within an outer imperforate tub or casing 4, the basket 2 and tub 4 forming together liquid and clothes containing means. The entire structure is generally mounted within a suitable appearance and protective cabinet which in this case has been omitted for clarity.

At the center of basket 2 there is provided a vertical axis agitator 5 which includes a center post 6 and a plurality of curved vanes 7 extending out from the center post and connected together at their base by a flared skirt 8. Both basket 2 and agitator 5 are movably mounted. Conventionally, the basket is mounted for rotation and the agitator is mounted for some type of oscillatory motion which will effect a washing action on clothes in the basket. In one conventional structure, basket 2 may be secured to a hollow shaft member 9, and the agitator may be secured to a shaft 10 which extends up within shaft 9 in rotatable relation thereto.

Basket 2 and agitator 5 are driven from a reversible drive motor 11 through a drive including a clutch 12 mounted on the motor shaft. Clutch 12 allows the motor to start without load and then pick up the load as it comes up to speed. A suitable belt 13 transmits power to transmission assembly 14 through a pulley 15. Thus, depending upon the direction of motor rotation, pulley 15 of transmission 14 is driven in opposite directions.

Transmission 14 is so arranged that it supports and drives both shafts 9 and 10. When motor 11 is rotated in one direction the transmission causes agitator 5 to be oscillated through shaft 10. Conversely, when the motor is driven in the opposite direction the transmisison drives wash basket 2 and agitator 5 together at a high speed through shafts 9 and 10 for centrifugal extraction of liquid from the clothes. While the particular form of drive means does not form part of the present invention, reference is made to Patent 2,844,225 issued on July 22, 1958 to James R. Hubbard et al., and owned by the General Electric Company, assignee of the present invention. That patent discloses in detail the structural characteristics of a transmisison suitable for use in the illustrated machine.

In order to introduce washing and rinsing liquid into the assembly of basket 2 and tub 4, suitable conduit means (not shown) are provided for leading hot and cold water to the supply assembly 16 of the machine. The passage of cold water may be controlled by valve 17 of the assembly whose condition in turn is controlled by a solenoid assembly partially shown by the numeral 18. As is well known in the art, when solenoid 18 is energized valve 17 is opened and cold water may flow through the valve into conduit 19 and then from outlet 20 into tub 4. When solenoid 18 is de-energized valve 17 is closed and there is no flow of cold water into tub 4. In similar fashion the flow of hot water is controlled by a valve 21 of assembly 16 which in turn is controlled by a solenoid partly shown by the numeral 22. Energization of solenoid 22 causes hot water to flow from conduit 19 out through opening 20, and de-energization of the solenoid closes the valve. A conventional pressure-sensitive switch 22a may be provided (as further explained in conlnnection with FIGURE 2) to de-energize solenoids 18 and 22 when the proper liquid level is reached in tub 4.

In addition to operating transmission 14 as described, motor 11 also provides a direct drive through a flexible coupling 23 to a pump structure, generally indicated by the numeral 24, which includes separate pumping units 25 and 26 both operated in the same direction simultaneously by motor 11. Pump 25 is connected by an inlet conduit 27 to an opening 28 formed at the lowermost point of tub 4. Pump 25 also has an outlet connected to a conduit 29 which, as will be further explained herebelow, leads to drain. Pump 25 is formed so that it tends to pump toward opening 28 during washing operations, but during spinning of the agitator and basket the pump draws water from opening 28 through conduit 27 and discharges it through conduit 29.

Pump 26 has an inlet which is connected by an inlet conduit 30 to the interior of tub 4, preferably adjacent the bottom thereof as shown, and also has an outlet connected to a conduit 31. In the wash direction of motor rotation pump 26 draws liquid in through conduit 30 and discharges it through conduit 31. In the opposite direction of rotation, pump 26 is substantially ineffective, as will further be seen herebelow, either being blocked off or else tending merely to pump air.

Pump assembly 24, in the embodiment shown, is provided in the form of two turbine type pumps 25 and 26 both driven by motor 11, it being well known that turbine type pumps reverse their pumping direction when their direction of rotation is reversed. However, in the broad aspect of my invention, as set forth herebelow, other structures for effecting the pumping of liquid may be used.

Conduit 31 leads to a T member 32, one of whose branches is joined to a conduit 33 extending up and terminating in a nozzle 34. Nozzle 34 is positioned to discharge into a filter pan 35 secured on the top portion 36 of agitator 5 so as to be movable therewith. With this structure then, when the motor is rotating so as to provide agitation, the liquid discharged from nozzle 34 by pump 26 passes across an air gap and then into filter pan 35. The filter pan has a perforated bottom (not shown) which acts as a lint filter, causing lint which is separated from the clothes during washing operations to be filtered out of the water and thus preventing it from being redeposited on the clothes. This type of structure is more fully described and claimed in Patent 2,481,979, issued to Russell H. Colley on September 13, 1949 and assigned to the General Electric Company, owner of the present invention.

In connection with this recirculation system, it will be observed that conduit 33 includes a squeeze valve structure 37 controlled by a solenoid 38 so that when the solenoid is energized the squeeze valve is closed, and during de-energization of the solenoid the squeeze valve is open.

The other branch of T 32 is joined to a conduit 39 which communicates with portion 40 of a double squeeze valve 41. Valve 41 has another section 42, with a single solenoid 43 controlling both sections as is well known in the art. When the solenoid is de-energized, valve portion 40 is closed and valve portion 42 is opened. Energization of solenoid 43 causes opening of valve portion 40 and closing of valve portion 42.

The other end of valve portion 40 is joined to a conduit section 44 leading through an opening 45 into a filtration unit generally shown by the numeral 46. Similarly, from valve portion 42 a conduit section 47 leads through an opening 48 into unit 46. The filtration unit is shown quite schematically to simplify and clarify the explanation of the system as a whole. It will, however, be understood that it has a suitable filtering structure 49 therein, and that, in the structure shown, liquid passes through the filtering structure from the outside, or upstream side, thereof to the inside, or downstream side, thereof in order to be filtered. In other words liquid entering unit 46 through opening 45 will pass through the filter 49 and then will pass out through opening 50.

A pair of conduits 51 and 52 connect openings 53 and 54 of filtration unit 46 to portions 55 and 56 of another double squeeze valve assembly shown by the numeral 57. Valve 57 has a solenoid 58 which controls valve portions 55 and 56 in the same manner set forth in connection with valve 41. When solenoid 58 is de-energized, valve portion 56 is open and valve portion 55 is closed. Conversely, when the solenoid is energized valve portion 56 closes and valve portion 55 opens.

From valve portion 56 a conduit 59 terminates in a nozzle 60 positioned so as to discharge into filter pan 35. Included in conduit 59 are a pair of venturi restrictions 61 and 62 which are useful, if such structures are to be provided, for the inclusion of suitable aspirating-type dispensers 63 and 64. When liquid is passing through conduit 59 to be discharged at nozzle 60, whatever substances are within containers 63 and 64 will be aspirated in the well known way so that a small amount of those substances joins the liquid passing through conduit 59 and being discharged at opening 60. The particular type of agent to be provided within containers 63 and 64 will be described herebelow in connection with the operation of my invention.

Completing now the description of the structure, it will be seen that conduit 29, which has already been described as connected to the outlet of pump 25, is connected to valve portion 55. Connected to valve portion 42 is a conduit 65 which extends out to a drain (not shown).

Referring now to FIGURE 2, the electrical control system for the machine of FIGURE 1 will be described. In connection with the circuit of FIGURE 2, it will be understood that present day washers often include various improvements such as two speed mechanisms, control panel lights, bleach dispenser controls, etc., which do not relate in any way to the present invention. Just as was done in connection with the physical structure shown in FIGURE 1, such items have been omitted to a substantial extent in FIGURE 2 for the sake of simplicity and ease of understanding.

In order to control the sequence of operations of the components of machine 1, the circuit includes an automatic sequence control assembly which incorporates a timer motor 66 driving a plurality of cams 67, 69, 70, 71, 72 and 73. These cams, during their rotation by the timer motor, actuate various switches (as will be described), causing the machine to pass through an appropriate cycle of operations, as will be more fully explained herebelow. The operating surfaces of the different cams are shown in developed form in FIGURE 3 and will be further discussed herebelow in connection with a description of the operation of the machine.

The electric circuit as a whole is energized from a power supply (not shown) through a pair of conductors 74 and 75. Cam 67 controls a switch 76 which includes contacts 77, 78 and 79; when the cam has assumed a position where all three contacts are separated, the machine 1 is disconnected from the power source and is inoperative. When operation of the machine 1 is to be initiated, switch 76 is controlled by cam 67 so that contacts 77 and 78 are engaged. When this happens power is then provided to the control circuit of the machine from conductor 74 through the two contacts 77 and 78.

From contact 78 the circuit extends through a conductor 80 and a pair of manually operated switches 81 and 82 to valve control solenoids 18 and 22 respectively. It can be seen that energization of solenoid 18 is enabled by the closing of switch 81, and energization of solenoid 22 is enabled by the closing of switch 82 so that either cold water, hot water or warm water may be obtained.

From solenoids 18 and 22, the energizing circuit then extends through a conductor 83 to the coil 84 of a relay 85, the main winding 86 of motor 11, a conventional motor protector 87, a switch 88 controlled by cam 70, and the conductor 75. Motor 11 is of the conventional type which is also provided with a starting winding 89 which assists the main winding 86 during starting of the motor and is energized in parallel therewith. When a relatively high current passes through relay coil 84, it causes relay contact 90 to be closed; this permits an energizing circuit for the start winding to be completed in parallel with the main winding through a contact 91 of a switch 92 controlled by cam 69, contact arm 93, relay contact 90, start winding 89, contact arm 94, and contact 95 of switch 92. A circuit is also completed in parallel with motor 11 from conductor 83 through the timer motor 66.

Relay coil 84 is designed to close contact 90 when a relatively high current, of the level demanded by the motor when the motor is rotating below a predetermined speed, is passing through it. At other times, when there is no current passing through relay coil 84 or when the current is below the required energizing level, as is true in the running speed range of the motor, contact 90 is opened.

When main winding 86 of motor 11 is in series with valve solenoids 18 and 22 as described, a much lower impedance is presented in the circuit by motor 11 than is presented by the valve solenoids. As a result, the greater portion of the supply voltage is taken up across the solenoids and relatively little across the motor. This causes whichever of the solenoids is connected in the circuit to be energized sufficiently to open its associated valve. As a result, water at the selected temperature is admitted to the machine through outlet 20, motors 11 and 66 remaining inactive.

This action continues with the circuitry thus arranged so that the water pours from supply valve assembly 16 into basket 2 and tub 4. Because of perforations 3, the water rises in both basket and tub at the same rate. As the head of water acting on switch 22a increases, it eventually actuates the switch (schematically shown in FIGURE 2) when the basket and tub have been filled to the desired level. When switch 22a closes, it then provides a short circuit across the solenoids directly from conductor 80 to conductor 83. With the solenoids thus excluded from the effective circuit, they become de-energized, and a high potential drop is provided across winding 86 of motor 11. This causes relay coil 84 to close contact 90 to start motor 11, while at the same time timer motor 66 starts so as to initiate a sequence of operations. It will thus be observed that the energization of valve solenoids 18 and 22 and the energization of drive motor 11 are alternative in nature.

Switch 88 is in series with main motor 11 but is not in series with timer motor 66. Thus, by the opening of this switch operation of motor 11 is stopped. The timer motor will nonetheless continue to operate because it is deliberately provided with an impedance much greater than that of the valve solenoids; it therefore takes up most of the supplied voltage and continues in operation, leaving so little voltage across the solenoids that they do not operate their respective valves.

A further point of the circuit of FIGURE 2 is that when switch arms 93 and 94 are moved by cam 69 to engage contact 95 and a contact 96 respectively, the polarity of the start winding is reversed. The circuit from conductor 83 then proceeds through contact 96, contact arm 94, start winding 89, relay contact 90, contact arm 93, and contact 95 to the protector device 87 and conductor 75. Thus, provided motor 11 is stopped or slowed down so that relay contact 90 is closed, reversal of switch 92 is effective to cause motor 11 to rotate in the opposite direction when the motor is started up again.

In order to energize motor 11 independently of the water level switch 22a and the valve solenoids, so that operation of the motor may be provided without regard to the presence of a predetermined water level, cam 67 is formed so that it may close all three contacts 77, 78 and 79 of switch 76. When this occurs, it causes the power to be supplied from conductor 74 directly through contact 79 to conductor 83 and the motors, rather than through the water level switch 22a or the valve solenoids.

The three valve solenoids 38, 43 and 58 controlling the squeeze valves 37, 41 and 57, respectively, are connected in parallel with each other across conductors 80 and 75. Energization of solenoid 38 is controlled by a switch 97 operated by cam 71. Similarly, a switch 98 under the control of cam 72 controls solenoid 43, and a switch 99 under the control of cam 73 controls solenoid 58.

Referring now to FIGURE 3 in conjunction with FIGURES 1 and 2, a sequence of operations of machine 1 will be described to illustrate the manner in which the improved structure and circuitry of my invention provides an effective washing cycle with a minimum usage of water. It is to be assumed that the cams of the timer are manually set at "wash," so that cam 67 has caused contacts 77 and 78 to be closed, cam 69 has caused the contact arms of switch 92 to be positioned as shown, and cam 70 has closed switch 88; cams 71, 72 and 73 all provide for the de-energization of their associated solenoids.

At this point, the first step which takes place is the filling of the machine with water by the energization of one or both of solenoids 18 and 22, depending on which of switches 81 and 82 have been manually closed. The energization of the solenoids, as previously explained, causes motors 11 and 66 to remain inactive, and this status continues until the closure of switch 22a at a predetermined level. At that time, the solenoids are de-energized and consequently motors 11 and 66 are energized, the energization of motor 11 being in the direction to cause an agitation operation (because of switch 92).

This washing action continues for a predetermined period after which, without necessarily interrupting the operation of the motor, cam 67 causes contacts 77 and 78 to engage contact 79, and cams 71 and 72 close switches 97 and 98 to cause energization of solenoids 38 and 43. Up to this time, with valve portion 40 closed and valve 37 open, the action of pump 26 provided for recirculation of liquid through conduits 31 and 33. However, the action of cams 71 and 72 closes valve 37 and opens valve portion 40. This prevents recirculation through conduit 33, but opens a path for recirculation to occur through conduits 39 and 44, the filtration unit 46, conduit 52, valve portion 56, and conduit 59.

The filtration unit then removes substantially all soil in the water passing through it. It is a known fact that the presence of detergent in the water does not generally prevent its being useful for rinsing purposes, and thus simply by the removal of the soil the water is made fit for a rinsing action on the clothes. Therefore, the water discharged from nozzle 60 is, in effect, rinse water which, as the recirculation continues, replaces the wash water.

If so desired, the suitability of the water being thus treated for rinsing purposes may be increased. Specifically, for instance, there are persons whose skin is sensitive to the alkaline residue which might be present in clothes washed and rinsed in this fashion, and there are fabrics adversely affected by a residue of chlorine bleach which might be used for washing purposes and would not be removed by the filter unit. However, it is an easy and simple matter to compensate for the presence of these materials by the provision of suitable materials in containers 63 and 64 to be aspirated into flow passing through conduit 59. For instance, in container 63 there might be a material which would neutralize the chlorine bleach residue so that it would not be harmful in any way. Such a material could, for instance, be hydrogen peroxide or sodium sulfite. Similarly, the alkalinity of the water being circulated can be compensated for by a suitable mildly acid solution, such as is commonly referred to as a "souring" agent. This might be provided in container 64, also to be mixed with the recirculated liquid by aspiration during recirculation of liquid through conduit 59. There are many suitable souring agents; for instance acetic acid and ammonium bifluoride represent two typical ones which might be used.

Thus, it is easily possible not only to remove soil by a mechanical type filter, but also to compensate for the chemical characteristics of the water. If this is done, it will then be seen that rinse water is provided which is completely adequate in virtually all respects.

The rinsing of clothes in this water may be provided for a suitable period, as shown in FIGURE 3, during which the water is continually being recirculated through the filter and the neutralizing agents are being introduced. Of course, no neutralizing agent may sometimes be needed, for instance, where no chlorine bleach has been used. It will readily be understood that suitable valve means (not shown) may be provided to shut off the aspiration of liquid from a container, either completely or for a timed period, to take care of such instances.

The liquid level in the tub and basket may go down to the point where switch 22a opens when the recirculation starts, depending upon the capacity of the recirculation system which includes the filtration unit. The closing of all three contacts of switch 76 overcomes this difficulty quite effectively by insuring that the supply solenoids 18 and 22 are bypassed, and that the motors 11 and 66 continue to run during the rinsing operation regardless of the condition of switch 22a.

At the end of the rinsing operation cam 70 opens switch 88, thereby de-energizing motor 11. Consequently, there is no further agitation although, as explained, timer motor 66 continues to operate. During the pause, cam 69 reverses the position of contact arms 93 and 94 so as to reverse the polarity of start winding 89 relative to main winding 86. In addition solenoids 38 and 43 are de-energized by cams 71 and 72, and cam 73 causes energization of solenoid 58. As a result of the reversal of switch 92, when switch 88 is reclosed at the end of the pause motor 11 is energized once again, but in the opposite direction.

The motor therefore starts to operate pump 25 to effect rapid removal of water from tub 4 through opening 28, while at the same time transmission 14 causes the basket to spin so as to centrifuge the water out of the clothes. The water is passed out by the pump 25 through conduit 29, valve portion 55, and conduit portion 51 into filtration unit 46, but in the reverse direction from that in which water flows during rinsing. As a result, there is a backflushing of the mechanical filter 49, and the filter is cleaned off. The liquid carrying the soil from the cleaned off filter then passes out through opening 48 to conduit portion 47 and then through open valve portion 42 and conduit 65 to a suitable drain.

At the end of a suitable period of spin, all components of the machine are de-energized by the opening of all three contacts of switch 76. In this manner, a complete operation is provided wherein the wash and rinse operations follow each other immediately, without a time consuming spin between them, and the same water is used for both wash and rinse by virtue of the novel arrangement I have set forth.

It will be clear that while a particular embodiment of my invention has been set forth, modifications thereto will readily occur to those skilled in the art. For instance (but without any intent to restrict such modifications to the examples hereafter specifically cited), a structure could readily be provided which would recirculate only during the rinse; in other words, the recirculation could be provided only for the filtering of the wash water to make it suitable for rinsing, rather than during washing as well. In addition, the capacity of the filtration unit might be such that it would be possible for all the liquid to be removed from tub 4 and retained in the filtration unit. For this purpose, an extra tank to increase the capacity of the filtration system might be provided. In such an event, it would then be possible, if it were so desired, to have a spin operation provided between wash and rinse, although a substantial advantage in time is obtained by eliminating the spin operation which is, in conventional machines today, provided between these two operations.

In addition, while it is obviously important that supply water be provided, then a wash operation, then a rinse operation with filtering, and then drain, some of these might occur simultaneously. For instance, there are some types of machines where no damage to the articles occurs as a result of operation of the washing means without water in the machine; in such a machine, the washing means could operate concurrently with the supply means. Also, as mentioned above, it would be possible if so desired to provide a spin between the wash and rinse operations, although this is not the preferred embodiment of my invention. The filtration and recirculation systems could be designed to recirculate liquid for a period without operation of the washing means if this were desired, although in my preferred embodiment the washing means continues to operate at the same time that the filtration unit operates.

It will also readily occur to those skilled in the art that different types of filtration units and different types of corrective additives may be provided, and I do not intend to be restricted to any particular type of structure although I provide in my preferred embodiment an arrangement wherein the soil is mechanically filtered out, and which may be backflushed out to the drain at the end of a cycle.

It will thus be understood that while in accordance with the patent statutes I have described what at present is considered to be the preferred embodiment of my invention, it will be obvious to those skilled in the art that various changes and modifications, including those set forth above and many others, may be made therein without departing from my invention, and it is therefore aimed in the appended claims to cover all such changes and modifications as fall within the true spirit and scope of the invention.

What I claim as new and desire to secure by Letters Patent of the United States is:

1. A washing system comprising:
   (a) container means for receiving articles and water;
   (b) supply means for providing water to said container means;
   (c) washing means for effecting the washing of articles in said container means;
   (d) filter means for removing lint from the water;
   (e) means for rehabilitating the water to make it suitable for rinsing the articles;
   (f) circulating means for circulating water out of said container and back thereto, said circulating means including a first passage passing through said filter means and a second passage passing through said rehabilitation means;
   (g) drain means for effecting removal of water from said container means to a drain;
   (h) and sequence control means for causing in sequence, first, operation of said supply means, second, operation of said washing means and said circulation means to effect washing of the articles including circulation of the water through said filter means, third, operation of said washing means and said circulation means to effect rinsing of the articles including circulation of the water through said rehabilitation means, fourth, operation of said drain means.

2. The apparatus defined in claim 1 wherein first and second valves are provided in said first and second passages respectively, said sequence control means causing said first valve to be open and said second valve to be closed during washing of the articles for circulating the water through said filter means, and said sequence control means causing said first valve to be closed and said second valve to be open during rinsing of the articles for circulating the water through said rehabilitation means.

3. The apparatus defined in claim 1 wherein said rehabilitation means includes a soil filter, said circulating means circulating the water through said soil filter in a first direction during rinsing of the articles for removing substantially all soil from the water and said drain means is arranged to pass the water through said soil filter in the reverse direction for cleaning said soil filter as said drain means discharges the water to a drain.

References Cited by the Examiner
UNITED STATES PATENTS

| | | |
|---|---|---|
| 1,450,054 | 3/23 | Titus. |
| 2,959,286 | 11/60 | Hickman. |
| 2,961,862 | 11/60 | Smith. |
| 2,967,084 | 1/61 | Reitz. |

WALTER A. SCHEEL, *Primary Examiner.*
WILLIAM I. PRICE, *Examiner.*